(12) United States Patent
Do Rosario et al.

(10) Patent No.: US 12,459,240 B2
(45) Date of Patent: Nov. 4, 2025

(54) COMPOSITE PANE HAVING ELECTRICALLY CONTROLLABLE OPTICAL PROPERTIES

(71) Applicant: SAINT-GOBAIN GLASS FRANCE, Courbevoie (FR)

(72) Inventors: Jefferson Do Rosario, Aachen (DE); Huixing Zhang, Aachen (DE); Valentin Schulz, Niederzier (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 806 days.

(21) Appl. No.: 17/760,600

(22) PCT Filed: Sep. 10, 2020

(86) PCT No.: PCT/EP2020/075302
§ 371 (c)(1),
(2) Date: Mar. 15, 2022

(87) PCT Pub. No.: WO2021/052852
PCT Pub. Date: Mar. 25, 2021

(65) Prior Publication Data
US 2022/0339911 A1  Oct. 27, 2022

(30) Foreign Application Priority Data
Sep. 16, 2019 (EP) .................................... 19197509

(51) Int. Cl.
*B32B 17/10* (2006.01)
*B32B 3/08* (2006.01)
(Continued)

(52) U.S. Cl.
CPC .......... *B32B 17/10495* (2013.01); *B32B 3/08* (2013.01); *B32B 7/023* (2019.01);
(Continued)

(58) Field of Classification Search
CPC ..... B32B 17/10495; B32B 3/08; B32B 7/023; B32B 17/10036; B32B 17/10229;
(Continued)

(56) References Cited

U.S. PATENT DOCUMENTS

2018/0009198 A1   1/2018  Weber et al.
2018/0281570 A1  10/2018  Labrot et al.

FOREIGN PATENT DOCUMENTS

CN   106457779 A   2/2017
CN   107614302 A   1/2018
(Continued)

OTHER PUBLICATIONS

International Search Report as issued in International Patent Application No. PCT/EP2020/075302, dated Oct. 15, 2020.

*Primary Examiner* — William R Alexander
*Assistant Examiner* — Mackenzi Waddell
(74) *Attorney, Agent, or Firm* — Pillsbury Winthrop Shaw Pittman LLP (57) ABSTRACT

A composite pane having electrically controllable optical properties, includes an outer pane and an inner pane, which are joined to one another via a thermoplastic intermediate layer, wherein an optoelectronic functional element having electrically controllable optical properties is embedded in the intermediate layer, which functional element comprises an active layer, with which transparent flat control electrodes are associated on both surfaces, between a first carrier film and a second carrier film, and wherein a capacitive contact switching element is arranged between the active layer and the thermoplastic intermediate layer.

16 Claims, 4 Drawing Sheets (51) Int. Cl.
  *B32B 7/023*    (2019.01)
  *B32B 27/08*    (2006.01)
  *B32B 27/30*    (2006.01)
  *B60J 3/04*     (2006.01)
  *G02F 1/133*    (2006.01)
  *G02F 1/1333*   (2006.01)

(52) U.S. Cl.
  CPC .. *B32B 17/10036* (2013.01); *B32B 17/10229* (2013.01); *B32B 17/10357* (2013.01); *B32B 17/10761* (2013.01); *B32B 27/08* (2013.01); *B32B 27/306* (2013.01); *B60J 3/04* (2013.01); *G02F 1/13306* (2013.01); *G02F 1/13338* (2013.01); *B32B 2250/04* (2013.01); *B32B 2250/40* (2013.01); *B32B 2255/205* (2013.01); *B32B 2255/28* (2013.01); *B32B 2307/202* (2013.01); *B32B 2307/204* (2013.01); *B32B 2307/42* (2013.01); *B32B 2307/732* (2013.01); *B32B 2605/00* (2013.01)

(58) Field of Classification Search
  CPC ........ B32B 17/10357; B32B 17/10761; B32B 27/08; B32B 27/306; B32B 2250/04; B32B 2250/40; B32B 2255/205; B32B 2255/28; B32B 2307/202; B32B 2307/204; B32B 2307/42; B32B 2307/732; B32B 2605/00; B32B 2250/03; B32B 17/1011; B32B 17/10192; B32B 17/10211; B32B 17/10293; B32B 17/10348; B32B 17/10504; B32B 17/10513; B32B 17/10532; B32B 17/1066; B32B 17/00; B32B 7/12; B32B 2457/202; B32B 2457/208; B32B 2605/08; B32B 17/10; B32B 2307/416; B60J 3/04; B60J 1/001; G02F 1/13306; G02F 1/13338; G02F 1/0102; G02F 1/0121; G02F 1/1333; G06F 3/044; G02B 27/0101; G02B 5/30

See application file for complete search history.

(56) References Cited

FOREIGN PATENT DOCUMENTS

| | | | | |
|---|---|---|---|---|
| CN | 108029160 A | 5/2018 | | |
| CN | 109874319 A | 6/2019 | | |
| CN | 110023081 A | 7/2019 | | |
| DE | 10 2005 007427 A1 | 8/2006 | | |
| DE | 10 2005 049081 B3 | 6/2007 | | |
| DE | 10 2007 027296 A1 | 12/2008 | | |
| DE | 10 2008 026339 A1 | 12/2009 | | |
| DE | 10 2013 001334 A1 | 7/2014 | | |
| EP | 3109946 A1 * | 12/2016 | ........... | H01R 12/724 |
| KR | 10-2017-0097135 A | 8/2017 | | |
| KR | 10-2018-0059531 A | 6/2018 | | |
| WO | WO-2016116372 A1 * | 7/2016 | ....... | B32B 17/10005 |
| WO | WO-2017157626 A1 * | 9/2017 | ....... | B32B 17/10036 |
| WO | WO 2019/086653 A1 | 5/2019 | | |
| WO | WO 2019/166155 A1 | 9/2019 | | |

\* cited by examiner

COMPOSITE PANE HAVING ELECTRICALLY CONTROLLABLE OPTICAL PROPERTIES

CROSS-REFERENCE TO RELATED APPLICATIONS

This application is the U.S. National Stage of PCT/EP2020/075302, filed Sep. 10, 2020, which in turn claims priority to European patent application number 19 197 509.3 filed Sep. 16, 2019. The content of these applications are incorporated herein by reference in their entireties.

The invention relates to a composite pane having electrically controllable optical properties and a composite pane assembly including such a composite pane and a method for producing such a composite pane. It further relates to a vehicle, in particular a road vehicle with such a composite pane and composite pane assembly.

Optoelectronic functional elements having electrically controllable optical properties have long been known in great variety and are used in industrial mass production, for example, in TV sets, laptops, mobile phones/smart phones, and tablets.

Composite panes having electrically controllable functional elements are also known per se. The optical properties of the functional elements can be changed by an applied electrical voltage. PDLC (polymer dispersed liquid crystal) functional elements, known, for example, from DE 102008026339 A1, are an example of such functional elements. The active layer contains liquid crystals incorporated in a polymer matrix. When no voltage is applied, the liquid crystals are aligned in a disorderly manner, resulting in strong scattering of the light passing through the active layer. When voltage is applied to the flat electrodes, the liquid crystals align themselves in a common direction and the transmittance of light through the active layer is increased.

Windshields and also glass roofs have been proposed in which an electrically controllable sun visor is realized by such a functional element to replace the prior art mechanically foldable sun visor in motor vehicles. Windshields with electrically controllable sun visors are, for example, known from DE 102013001334 A1, DE 102005049081 B3, DE 102005007427 A1, and DE 102007027296 A1.

Likewise known for several years have been so-called "head-up displays", with which data particularly important to the driver of a passenger car (such as speed limits, navigation instructions, current vehicle speed, or the like) are displayed directly in the driver's field of vision. It goes without saying that such optoelectronic display elements have patterned control electrodes and interact with correspondingly more complex control units.

SPD (suspended particle device), PNLC (polymer networked liquid crystal), and PDLC functional elements are commercially available as multilayer films in which the active layer and the flat electrodes required for applying voltage are arranged between two carrier films, typically made of PET. In the production of the composite pane, the functional element is cut in the desired size and shape from the multilayer film supplied and inserted between the films of an intermediate layer by means of which two glass panes are laminated to one another to form the composite pane.

Furthermore, it is already known to associate composite panes having integrated optoelectronic functional elements with actuation means by means of which manual ON/OFF switching or other manual actuation can be carried out. Such actuation means are normally situated on the dashboard or on an actuation unit at the upper edge of the windshield, adjacent the roof liner. This placement of the actuation means makes intuitive operation more difficult and requires adaptations in each case between certain windshield types with integrated functional elements having different structures or different configurations and the respective specific design of the dashboard or the actuation unit at the upper edge of the pane.

WO 2019/086653 A1 discloses a composite pane having an optoelectronic functional element that is arranged between two intermediate layers. The optoelectronic functional element can be controlled by a capacitive button arranged in the region of the functional element. There is no indication as to the design of the capacitive button and its arrangement in the layer stack.

The object of the invention is, consequently, to provide an improved composite pane having an integrated optoelectronic functional element, which, in particular, facilitates intuitive actuation of the functional element and makes adaptations of other components of the vehicle equipment to specific configurations of the windshield largely unnecessary. Furthermore, the object of the invention is to provide an improved simple method for producing such a composite pane.

The object of the present invention is accomplished in its product aspect by a composite pane in accordance with the independent claim 1. In its assembly or system aspect, the object is accomplished by a composite pane assembly with the features of claim 12. Preferred embodiments emerge from the dependent claims.

The composite pane according to the invention comprises at least an outer pane and an inner pane that are joined to one another via a thermoplastic intermediate layer. The composite pane is intended, in a window opening, for example, of a vehicle, of a building, or of a room, to separate the interior from the external environment. In the context of the invention, "inner pane" refers to the pane facing the interior. "Outer pane" refers to the pane facing the external environment. The intermediate layer serves to join the two panes, as is customary with composite panes.

The outer pane and the inner pane are preferably made of glass. However, in principle, they can also be made of plastic. The thickness of the outer pane and the inner pane can vary widely and thus be adapted to the requirements of the individual case. The outer pane and the inner pane preferably have thicknesses from 0.4 mm to 3.5 mm, particularly preferably from 1 mm to 2.5 mm. The panes can be clear, or even tinted, or colored. In the case of use of the composite pane as a windshield in a passenger car, care must be taken for the windshield to have, in the central field of vision, sufficient light transmittance, preferably at least 70% in the main through-vision region A per ECE-R43.

Furthermore, the invention can also be used for roof glazings ("sunroofs") of various vehicles, in particular of passenger cars, but, for example, also boats/ships or buses. The technical details largely correspond to the aspects of the invention described above and in the following. The outer pane, the inner pane, and/or the intermediate layer can have other suitable coatings known per se, for example, antireflective coatings, nonstick coatings, anti-scratch coatings, photocatalytic coatings, or solar protection coatings or so-called "low-E coatings".

The composite pane according to the invention contains an optoelectronic functional element having electrically controllable optical properties that is embedded in the intermediate layer. The functional element is arranged between at least two layers of thermoplastic material of the intermediate layer, being joined to the outer pane by the first layer and to the inner pane by the second layer.

The functional element includes at least one active layer that is arranged between a first carrier film and a second carrier film. The active layer has the variable optical properties that can be controlled by an electrical voltage applied to the active layer. In the context of the invention, "electrically controllable optical properties" means properties that can be continuously controlled, but also properties that can be switched between two or more discrete states. Said optical properties relate, in particular, to the light transmittance and/or the scattering behavior. The functional element also includes flat electrodes for applying the voltage to the active layer, which are preferably arranged between the carrier films and the active layer. The first carrier film is arranged on the side of the active layer that faces in the direction of the outer pane, and the second carrier film is arranged on the side of the active layer that faces in the direction of the inner pane.

In a preferred embodiment, the functional element is a PDLC functional element. The active layer of a PDLC functional element contains liquid crystals that are embedded in a polymer matrix. In another preferred embodiment, the functional element is an SPD functional element. In that case, the active layer contains suspended particles, with the absorption of light by the active layer being variable by means of application of a voltage to the flat electrodes. In principle, it is, however, also possible to use other types of controllable functional elements, for example, electrochromic functional elements. Such controllable functional elements and their mode of operation are known per se to the person skilled in the art such that a detailed description can be dispensed with here.

The flat electrodes and the active layer are typically arranged substantially parallel to the surfaces of the outer pane and the inner pane. The flat electrodes are electrically connected to an external voltage source in a manner known per se. The electrical contacting, just like the connection to the energy source for tempering the active layer, is realized by suitable connection cables, for example, foil conductors, that are optionally connected to the flat electrodes via so-called bus bars, for example, strips of an electrically conductive material or electrically conductive imprints. The thickness of the functional element is, for example, from 0.1 mm to 1 mm.

The flat electrodes are preferably designed as transparent, electrically conductive layers. The flat electrodes preferably contain at least a metal, a metal alloy, or a transparent conductive oxide (TCO). The flat electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The flat electrodes preferably have a thickness of 10 nm to 2 µm, particularly preferably from 20 nm to 1 µm, most particularly preferably from 30 nm to 500 nm.

The functional element is, in particular, a multilayer film with two outer carrier films. In such a multilayer film, the flat electrodes and the active layer are typically arranged between the two carrier films. Here, the expression "outer carrier film" means that the carrier films form the two surfaces of the multilayer film. As a result, the functional element can be provided as a laminated film that can advantageously be further processed. The carrier films advantageously protect the functional element against damage, in particular corrosion.

The invention includes the idea of implementing the actuation of a functional element integrated locally in the composite pane in an ideally intuitive manner directly at the installation location of the functional element or in any case in its immediate vicinity directly on the composite pane. It further includes the idea of integrating, for this purpose, a switching element with the capacitive touch function suitable for this in the interior of the composite pane.

In particular, the optoelectronic functional element is provided in a first subregion of the composite pane, and the contact switching element is placed in a second subregion of the composite pane contained in the first subregion.

The contact switching element is arranged between the active layer of the optoelectronic functional element and the thermoplastic intermediate layer. The contact switching element is arranged on the side of the active layer that faces in the direction of the inner pane, such that the function of the capacitive contact switching element is ensured when operated from the interior. The thermoplastic intermediate layer preferably comprises a first layer of thermoplastic material that faces the outer pane and a second layer of thermoplastic material that faces the inner pane. In this case, the contact switching element is arranged between the second layer of thermoplastic material and the active layer. Preferably, the capacitive contact switching element is arranged in direct contact with the second carrier film. The contact switching element can thus be integrated into the composite pane as part of a multilayer film comprising the optoelectronic functional element when it is attached directly to the second carrier film. This offers the advantage that no further separate foil pieces having a contact switching element are integrated in the composite glass pane, which can, for example, result in changes in the thickness of the pane.

In a first implementation variant, this can be achieved in that the contact switching element has a patterned conductive layer that is arranged on the surface of the optoelectronic functional element associated with the inner pane. Accordingly, a patterned conductive layer is arranged in the region of the contact switching element. The patterned conductive layer can be applied on the second carrier film by, for example, gluing on pre-prepared conductor patterns or by printing. Preferably, in this variant the patterned conductive layer appears to have a contact switch structure formed by laser patterning of a conductive layer, wherein the conductive layer is deposited in a vacuum-based coating method. Suitable vacuum-based coating methods are, for example, CVD (chemical vapor deposition) or PVD (physical vapor deposition).

This variant is particularly suitable for applications in which a composite pane according to the invention is to be produced with a commercially available PDLC composite film or another standard prefabricated intermediate layer laminate having an integrated functional element. To implement the invention, either only one surface of the laminate supplied or the side of the inner pane facing the intermediate layer must be provided with the contact switching element (and supply lines) at a suitable location.

In an alternative embodiment of the invention, the contact switching element is formed by a dedicated contact switch structure of the flat control electrode of the optoelectronic functional element facing the inner pane. This embodiment is suitable for applications in which either a control electrode structure of the optoelectronic functional element can be designed from the outset taking into account the function according to the invention and then manufactured accordingly. It accordingly requires a configuration of the intermediate layer laminate according to the invention but enables elimination of post-treatment steps such as those required with the implementation variant mentioned above.

Particularly preferably, the contact switch structure is generated by laser patterning of the flat control electrode facing the inner pane. This can be done by laser treatment of a commercially available composite film containing the optoelectronic functional element. The laser patterning can be flexibly adapted to the respective installation situation such that the location and shape of a contact switching element can easily be varied in its area.

The position of the contact switching element can be made readily recognizable visually for the user by suitable markings, for example, by providing a black print on or around the contact switching element. Such a black print is, for example, provided anyway in passenger car windshields or sunroofs in their edge region such that, in practice, such a marking of the contact field element requires no additional technical effort and does not make the pane more expensive.

In a configuration suitable for simple switching functions, the contact switching element has two parallel or concentric conductors that have a contact switching section arranged at a distance in the range between 0.3 and 1.5 cm, in particular between 0.5 and 1 cm from one another. The conductor spacing must be dimensioned for the reliable implementation of a switching function using a finger or even the thumb of an adult and can, optionally, also be positioned outside the range mentioned here.

For more complex control functions, the contact switching element preferably has a plurality of conductors spaced apart from one another, connected or connectable separately to the outside of the optoelectronic functional element. In the case of such a configuration, a specific setting can be selected from a plurality that are available in particular with the "swipe" known from smart phones and similar devices or selective touching of a subregion thereof.

In addition to the composite pane explained above, the composite pane assembly according to the invention includes a control unit for controlling the optical properties of the optoelectronic functional element and a switching control unit connected to the contact switching element for switching for manual control of the optoelectronic functional element, in particular for ON/OFF switching or for a contrast or brightness adjustment or the like.

In a configuration suitable for control procedures that go beyond simple ON/OFF switching, the switching control unit has a number of inputs corresponding to the number of separately connectable conductors of the contact switching element. In response to a signal input at the respective signal inputs, it activates one of more than two control states of the optoelectronic functional element.

Another aspect of the present invention is a method for producing a composite pane according to the invention.

An optoelectronic functional element comprising a layer stack, comprising, in the order indicated, a first carrier film, a transparent flat control electrode, an active layer, a transparent flat control electrode, and a second carrier film, is provided with a capacitive contact switching element. The optoelectronic functional element is then laminated between an outer pane and an inner pane via a thermoplastic intermediate layer.

The method thus enables simple production of a composite pane including an optoelectronic functional element with a capacitive contact switching element via a simple lamination method. Since the required patterns for the contact sensor are already integrated into the multilayer film with the optoelectronic functional element, only this one additional part has to be integrated and aligned at the time of lamination and provided with electrical connections. This simplifies the production method compared to conventional production in which separate components are required for the contact switching elements in each case. In addition, material incompatibilities due to additionally inserted separate films with a contact switching element are avoided.

The layer stack without a capacitive contact switching element is commercially available. It is now provided with a capacitive contact switching element, preferably by printing or gluing a patterned conductive layer onto the surface of the second carrier film. In a preferred alternative, a conductive layer is deposited on the exposed surface of the second carrier film, at least in the region of the capacitive contact switching element, preferably using a CVD or PVD method.

This conductive layer can subsequently be patterned with a laser such that a contact switch structure is created.

In a preferred alternative, a capacitive contact switching element is created by laser patterning of the flat control electrode that is adjacent the second carrier film. Here, the laser is focused on the layer with the flat control electrode without damaging the overlying carrier film. This creates electrically insulating regions that separate the individual conductor tracks from one another.

The invention is explained in greater detail with reference to figures and exemplary embodiments. The drawings are schematic representations and not to scale. The figures in no way restrict the invention. They depict.

Figure 1:
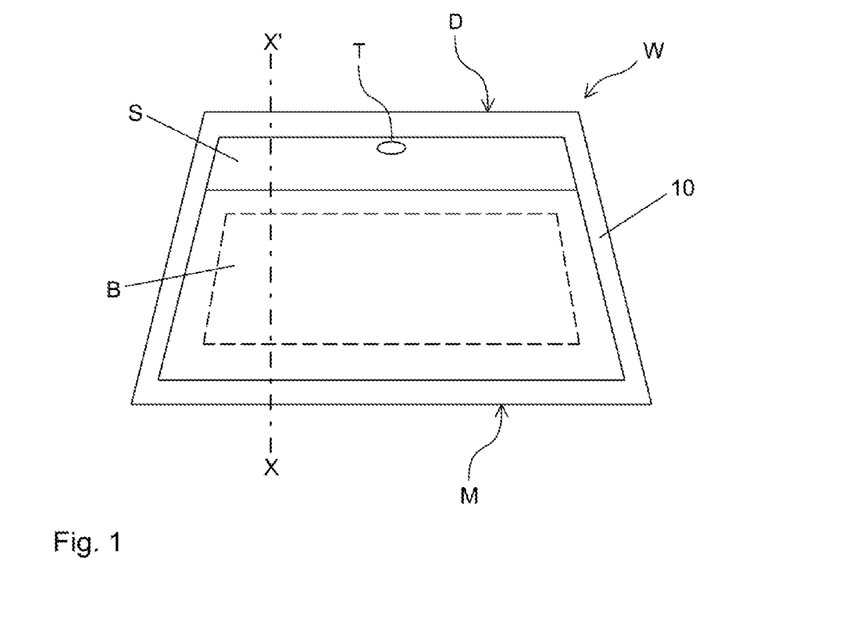
FIG. 1 a plan view of a first embodiment of the composite pane according to the invention as a windshield with an electrically controllable sun visor, FIG. 2 a cross-section through the windshield of FIG. 1, FIG. 3 an enlarged representation of the region Z of FIG. 2, FIG. 4 a schematic perspective representation of an embodiment of the composite pane according to the invention, FIG. 5 a schematic representation of an alternative implementation of the contact switching element in a composite pane according to the invention, and FIG. 6 a schematic representation of an embodiment of the composite pane assembly according to the invention in the manner of a functional block diagram.
Figure 2:
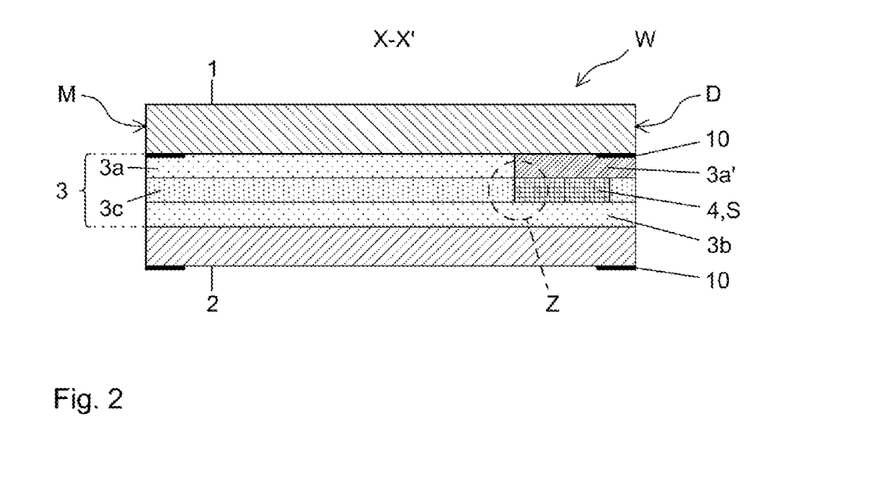
Figure 3:
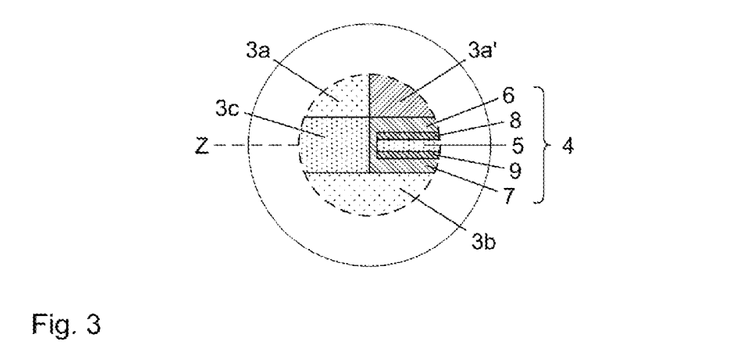

FIG. 1, FIG. 2, and FIG. 3 depict in each case a detail of a windshield W with an electrically controllable sun visor S, an exemplary embodiment of the composite pane according to the invention having electrically controllable optical properties. The windshield W comprises an outer pane 1 and an inner pane 2 joined to one another via an intermediate layer 3. The outer pane 1 has a thickness of 2.1 mm and is made of a green-colored soda lime glass. The inner pane 2 has a thickness of 1.6 mm and is made of a clear soda lime glass. The windshield has an upper edge D facing the roof in the installed position and a lower edge M facing the engine compartment in the installed position.

The windshield is equipped with an electrically controllable sun visor S in a region above the central field of vision B (as defined in ECE-R43). A contact switching element T for ON/OFF switching of the sun visor function and, optionally, (depending on the specific embodiment) also for manual adjustment of the degree of transmittance of the sun visor are provided in the upper edge region of the sun visor.

The sun visor S is formed by a commercially available PDLC multilayer film as a functional element 4, which is embedded in the intermediate layer 3. The intermediate layer 3 includes a total of three thermoplastic layers 3a, 3b, 3c, formed in each case by a thermoplastic film with a thickness of 0.38 mm made of PVB. The first thermoplastic layer 3a is bonded to the outer pane 1; the second thermoplastic layer 3b, to the inner pane 2. The third thermoplastic layer 3c interposed therebetween has a cutout, into which the cut-to-size PDLC multilayer film is inserted with a substantially precise fit, i.e., roughly flush on all sides. The third thermoplastic layer 3c thus forms, so to speak, a sort of passe-partout for the roughly 0.4-mm-thick functional element 4, which is thus encapsulated all around in thermoplastic material and is thus protected.

The first thermoplastic layer 3a has a tinted region 3a' arranged between the functional element 4 and the outer pane 1. The light transmittance of the windshield is, as a result, additionally reduced in the region of the sun visor 4, and the milky appearance of the PDLC functional element 4 in the diffuse state is toned down. The aesthetics of the windshield are thus made significantly more appealing.

The controllable functional element 4 is a multilayer film, consisting of an active layer 5 between two flat electrodes 8, 9 and two carrier films 6, 7. The active layer 5 contains a polymer matrix with liquid crystals dispersed therein, which align themselves as a function of the electrical voltage applied to the flat electrodes, by which means the optical properties can be controlled. The carrier films 6, 7 are made of PET and have a thickness of, for example, 0.125 mm.

The carrier films 6, 7 are provided with a coating of ITO with a thickness of approx. 100 nm, on the surface facing the active layer 5, forming the flat electrodes 8, 9. The flat electrodes 8, 9 can be connected to the on-board electrical system by means of bus bars (not shown) (for example, formed by a silver-containing screen print) and connecting cables (likewise, not shown). To implement the present invention, the flat electrode 9 facing the inner pane 2 of the windshield W can be provided in a small subregion with a conductor pattern produced by laser processing, by means of which the contact switching element T (FIG. 1) is formed and connected, on the one hand, to the large-area ITO coating for realizing the sun visor function and, on the other, to the on-board electronics.

The windshield has, as is customary, a surrounding peripheral masking print 10 formed by an opaque enamel on the interior-side surface (facing the interior of the vehicle in the installed position) of the outer pane 1 and the inner pane 2. The distance of the functional element 4 from the upper edge D and the side edges of the windshield is less than the width of the masking print 10 such that the side edges of the functional element 4—with the exception of the side edge facing the central field of vision B—are concealed by the masking print 10. The electrical connections (not shown) are also expediently installed in the region of the masking print 10 and are thus hidden. The contact switching element T can also be placed in the region of the masking print, in particular when it is formed by a nontransparent conductor structure (see below).

Figure 4:
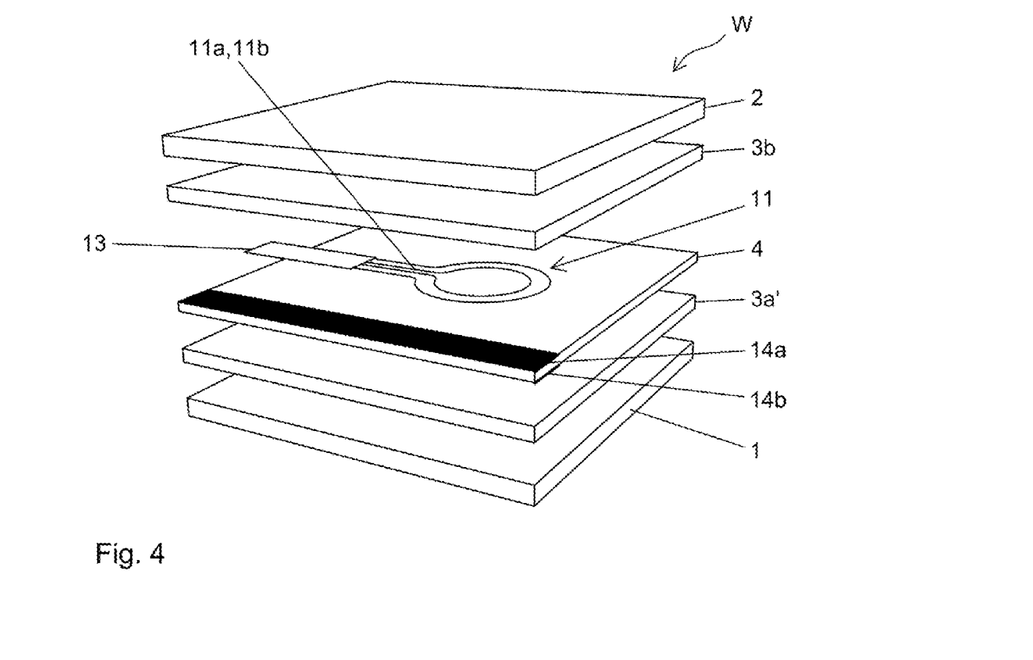

FIG. 4 depicts an exemplary embodiment of the windshield W that has the structure depicted in FIG. 2 with a special configuration of the contact field element. The components of the windshield are identified with the same reference numbers also used in FIG. 2, and, here, the contact switching element has the reference number 11.

As can be seen in the figure, the contact field element 11 comprises two concentric circular conductors 11a, 11b that are connected to a dedicated connector 13 (for instance, in the form of an MQS (micro quadlock system) connector) for the external connection of the contact switching element. The connector 13 is arranged at a different side edge of the optoelectronic functional element 4 than the bus bars 14a, 14b that connect the functional element to an external control circuit (not shown here). The contact switching element 11 with the conductors 11a, 11b can—as noted above—be formed by laser patterning of one of the transparent surface elements 8, 9 of the optoelectronic functional element 4 using techniques and laser beam processing devices known per se.

Figure 5A:
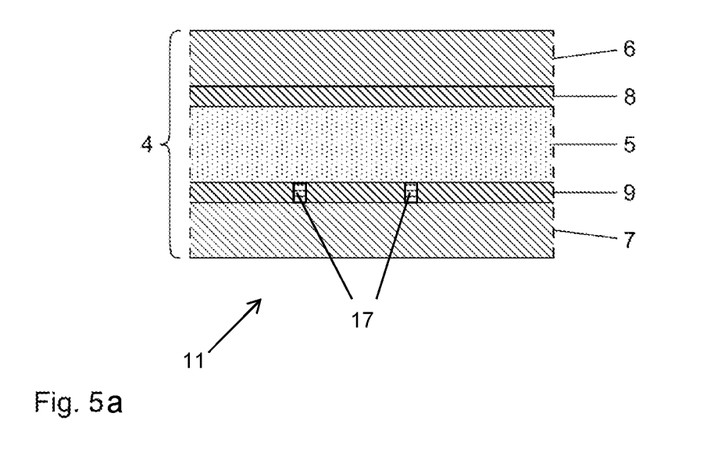
Figure 5B:
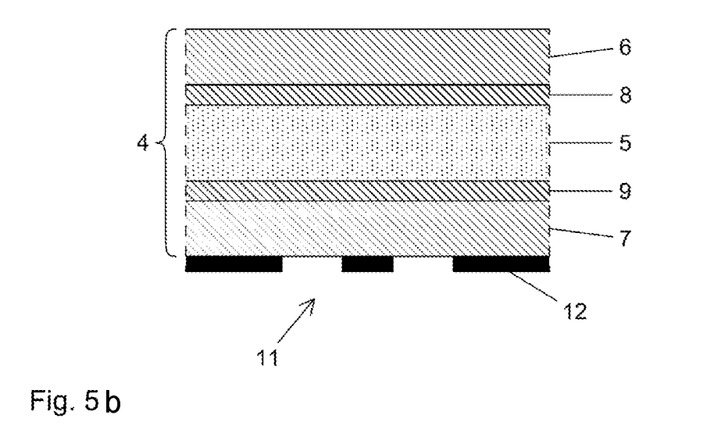

FIG. 5a depicts a cross-section through a region having a contact switching element 11 that was created by laser patterning of a flat electrode 9 of the functional element 4. The electrically insulating regions 17 are created by laser treatment. FIG. 5b depicts an alternative implementation of the contact switching element 11, in which a separate conductive layer 12 is created on the optoelectronic functional element 4. Here, the contact switching element 11 is formed by patterning the additional conductive layer 12, while, here, the flat electrodes 8, 9 of the functional element 4 serve exclusively to implement its other functions.

This embodiment enables the use of intermediate layer laminates configured independently of the contact switching function and the subsequent implementation of the contact switching function as part of the functional element 4.

In a modification of the structure depicted in FIG. 5b, the conductive layer 12 can, in principle, also be provided on the inner surface of the inner pane of a windshield facing the functional element 4. The additional conductive layer 12 can, for example, be formed by a printing method known per se or also by sputtering.

Figure 6:
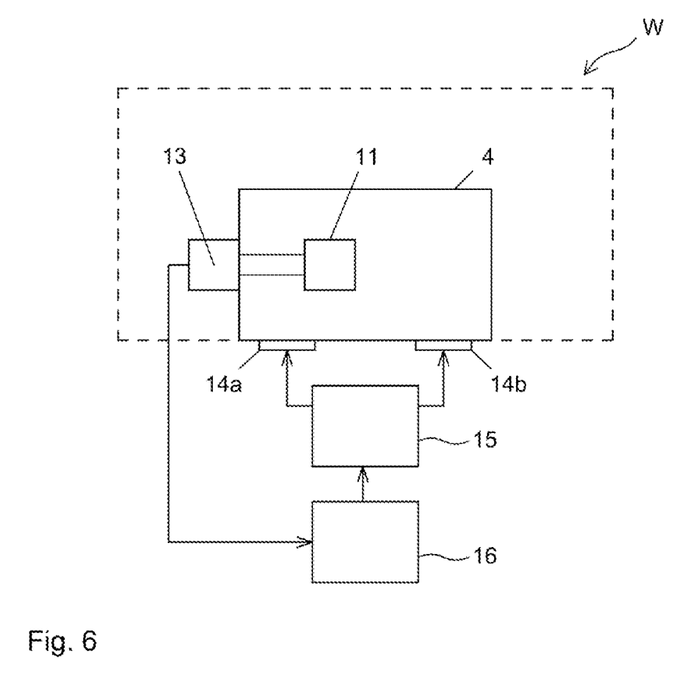

FIG. 6 schematically depicts a composite pane assembly, comprising a windshield W designed according to the invention and associated control devices in a vehicle (not shown).

An optoelectronic functional element 4 is arranged in a subregion of the windshield W, and a contact switching element 11 is, in turn, provided in a subregion of the surface of the functional element 4. As already depicted in FIG. 5, two bus bars 14a, 14b are arranged at a first side edge of the functional element 4 for its connection in a manner known per se, and a special connector 13 placed on a different side edge of the functional element is associated with the contact switching element 11. Both instead of the bus bars 14a, 14b and also the connector 13 specified above as an MQS connector, other types of connectors can, in principle, be used, provided they are suitable for use in or with a composite pane of the type in question here.

Whereas the functional element 4 is controlled in a manner known per se by a control unit 15 for realizing its usual functions, the contact switching element 11 is connected via the connector 13 to a switching control unit 16, which controls, for example, the ON/OFF state of the functional element 4 or, optionally, even of subsections thereof or even certain parameters of the functional element 4 based on manual actuation by the driver. This can, for example, be a degree of transmittance or a contrast ratio or brightness or other parameters whose individual adjustment by the driver of the vehicle is useful or desirable as a function of the ambient conditions or according to the drivers preferences.

The figure illustrates the linkage of the functions of the control unit 15 and the switching control unit 16, merely schematically, using only a simple signal connection; however, the interaction of the two units can be designed in a more complex manner, and the two units 15, 16 can also be integrated with one another.

Overall, the implementation of the invention is not limited to the aspects highlighted above and examples described above, but is equally possible in a large number of variants that are within the scope of the appended claims.

REFERENCE CHARACTERS 1 outer pane
2 inner pane 3 thermoplastic intermediate layer
3a first layer of the intermediate layer 3
3a' tinted region of the first layer 3a
3b second layer of the intermediate layer 3
3c third layer of the intermediate layer 3
4; S functional element having electrically controllable optical properties
5 active layer of the functional element 4
6 first carrier film of the functional element 4
7 second carrier film of the functional element 4
8, 9 flat electrode of the functional element 4
10 masking print
11; T contact switching element
11a, 11b conductor of the contact switching element
12 conductive layer
13 connector of the contact switching element
14a, 14b control connectors (bus bars)
15 control unit
16 switching control unit
17 electrically insulating region
B field of vision of the windshield
D upper edge of the windshield
M lower edge of the windshield
S sun visor
W windshield
X-X' section line
Z detail region of the windshield

The invention claimed is:

1. A composite pane having electrically controllable optical properties, comprising an outer pane and an inner pane, which are joined to one another via a thermoplastic intermediate layer,
   wherein an optoelectronic functional element having electrically controllable optical properties is embedded in the thermoplastic intermediate layer, which optoelectronic functional element comprises an active layer, with which transparent flat control electrodes are associated on both surfaces, between a first carrier film and a second carrier film, and
   wherein a capacitive contact switching element is arranged between the active layer and the thermoplastic intermediate layer, in direct contact with the second carrier film facing in the direction of the inner pane.

2. The composite pane according to claim 1, wherein in the region of the capacitive contact switching element, a patterned conductive layer is arranged, which is arranged on a surface of the optoelectronic functional element associated with the inner pane.

3. The composite pane according to claim 2, wherein the patterned conductive layer has a contact switch structure that is formed by laser patterning of a conductive layer deposited in a vacuum-based coating method.

4. The composite pane according to claim 1, wherein the capacitive contact switching element is formed by a dedicated contact switch structure of the transparent flat control electrode of the optoelectronic functional element facing the inner pane.

5. The composite pane according to claim 1, wherein the optoelectronic functional element is a PDLC functional element, PNLC functional element, SPD functional element, or electrochromic functional element.

6. The composite pane according to claim 1, wherein the optoelectronic functional element is provided in a first subregion of the composite pane and the capacitive contact switching element is placed in a second subregion of the composite pane, which is included in the first subregion.

7. The composite pane according to claim 1, wherein the optoelectronic functional element has a control connector electrically connected to the capacitive contact switching element.

8. The composite pane according to claim 1, wherein the capacitive contact switching element has two parallel or concentric conductors that have a contact switch section spaced at a distance in the range between 0.3 and 1.5 cm from one another.

9. The composite pane according to claim 1, wherein the capacitive contact switching element has a plurality of conductors that are spaced apart from one another and are separately connected or connectable toward the outside of the optoelectronic functional element.

10. The composite pane according to claim 1, wherein a visual marking is associated with the capacitive contact switching element, which identifies its position for the user.

11. The composite pane according to claim 1, implemented as a windshield or roof glazing of a road vehicle or an aircraft or watercraft.

12. The composite pane according to claim 7, wherein the control connector has an MQS plug.

13. The composite pane according to claim 8, wherein said distance is between 0.5 and 1 cm.

14. The composite pane according to claim 10, wherein the visual marking is a black print region.

15. The composite pane according to claim 11, wherein the road vehicle is a passenger car and the aircraft or watercraft is a boat or a passenger ship.

16. The composite pane according to claim 1, wherein the capacitive contact switching element comprises a patterned portion of the transparent flat control electrode of the optoelectronic functional element.

* * * * *